United States Patent [19]

Kanji et al.

[11] Patent Number: 4,912,502

[45] Date of Patent: Mar. 27, 1990

[54] PHOTOGRAPHIC PRINTING TAPE PUNCHER

[75] Inventors: Tokuda Kanji, Kanagawa; Matsumoto Fumio, Tokyo; Yoshihiko Saeki; Kiichiro Sakamoto, both of Kanagawa, all of Japan

[73] Assignee: Fuji Photo Film Co., Ltd., Kanagawa, Japan

[21] Appl. No.: 200,867

[22] Filed: Jun. 1, 1988

[30] Foreign Application Priority Data

Jun. 2, 1987 [JP] Japan ................................ 62-138796

[51] Int. Cl.4 ................................ G03B 72/27

[52] U.S. Cl. ................................ 355/29; 355/38; 355/40; 355/68

[58] Field of Search ................................ 355/38, 40, 68, 77, 355/29

[56] References Cited

U.S. PATENT DOCUMENTS

| | | | |
|---|---|---|---|
| 4,574,692 | 3/1986 | Wahli | 355/77 X |
| 4,659,213 | 4/1987 | Matsumoto | 355/40 X |
| 4,728,996 | 3/1988 | Matsumoto | 355/68 X |
| 4,782,390 | 11/1988 | Hayashi | 355/38 X |
| 4,797,712 | 1/1989 | Hayashi et al. | 355/38 |

*Primary Examiner*—Donald D. Griffin
*Assistant Examiner*—D. Rutledge
*Attorney, Agent, or Firm*—Sughrue, Mion, Zinn, Macpeak & Seas

[57] ABSTRACT

A photographic printing tape puncher for recording, on a paper tape, information on exposure correction for each of image frames formed on an original picture film before the film is used to perform printing. A frame number reading means reads bar codes which represent frame numbers and which are recorded on a part of the original picture film. The information thereby read is recorded on the paper tape along with items of information on exposure correction for the corresponding image frames. The items of exposure correction information and the frame numbers relating to the image frames are recorded on the paper tape constantly in correspondence with each other. It is therefore possible to easily obtain desired exposure correction information by searching a corresponding image frame number on the paper tape.

10 Claims, 4 Drawing Sheets

PHOTOGRAPHIC PRINTING TAPE PUNCHER

BACKGROUND OF THE INVENTION

This invention relates to a photographic printing tape puncher for recording, on a paper tape, exposure correction information for each of the image frames of an original picture film before printing process. More particularly, this invention relates to a photographic printing tape puncher capable of recording, on a paper tape, the image frame number along with the exposure correction information.

A type of automatic photographic printing apparatus is known which is used to form prints of framed images recorded on an original picture film such as a developed negative film by printing the framed images on photographic paper and thereafter developing the photographic paper. Before the printing processing is performed with this type of automatic photographic printing apparatus, an examining operation is performed by an examining device (including a puncher), The automatic photographic printing apparatus performs printing on the basis of the results of the examining operation. That is, in the automatic photographic printing apparatus, a puncher punches a paper tape or a recording medium so as to record information on the required amount of exposure correction. The exposure correction is determined with respect to the exposure in accordance with an average transmission density obtained by photometry in respect of the corresponding image recorded on the original picture film. The automatic photographic printing apparatus prints the image on photographic paper on the basis of the exposure correction information.

However, if part of the process of printing and developing image frames fails (e. g., exposure failure or color balance failure), it is necessary to perform reprinting. If, in such a case, image frames analogous to each other are successively formed on the original picture film, it is difficult to find the frame corresponding to an inferior image among the image frames formed on the original picture film when it is desired to reprint this image. In particular, in a process of dealing with a considerable length of original picture film formed by connecting a plurality of films by use of splice tapes, the efficiency of reprinting with respect to one order is very low. Moreover, when the customer reorders an additional print, it is troublesome to select the desired frame since the correspondence between the print and the image frame of the original picture film is indefinite.

SUMMARY OF THE INVENTION

It is therefore an object of the present invention to provide a photographic printing tape puncher for facilitating collation between a print and a corresponding image frame formed on the original picture frame.

To this end, the present invention provides a photographic printing tape puncher for recording, on a paper tape, information on exposure correction for each of the image frames of an original picture film before the printing process. The method includes a frame number reading means for reading the image frame numbers previously displayed on the original picture film. In addition, a control means is provided for recording on the paper tape the frame numbers read by the frame number reading means along with information on exposure correction for the frames corresponding to the frame numbers.

In accordance with the present invention, the frame numbers previously displayed on the original picture frame are read by the frame number reading means, and the paper tape is punched under the control of the control means so that the frame numbers of the image frames formed on the original picture film are recorded together with the exposure correction information provided in correspondence with those image frames. In a succeeding process, the frame numbers are displayed on photographic paper in correspondence with the frame numbers recorded on the paper tape, thereby facilitating collation between corresponding frames formed on the original picture film and the photographic paper.

DESCRIPTION OF THE PREFERRED EMBODIMENT

Figure 1:
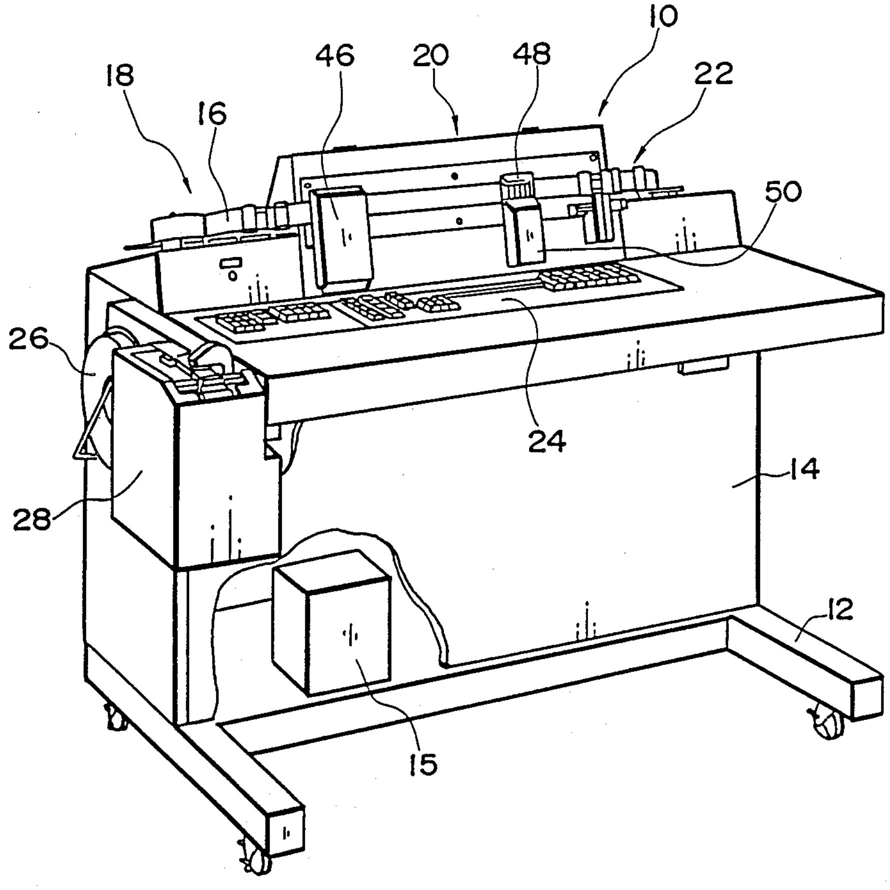
FIG. 1 is a perspective view of the appearance of a notcher-puncher to which the present invention is applied.
Figure 2:
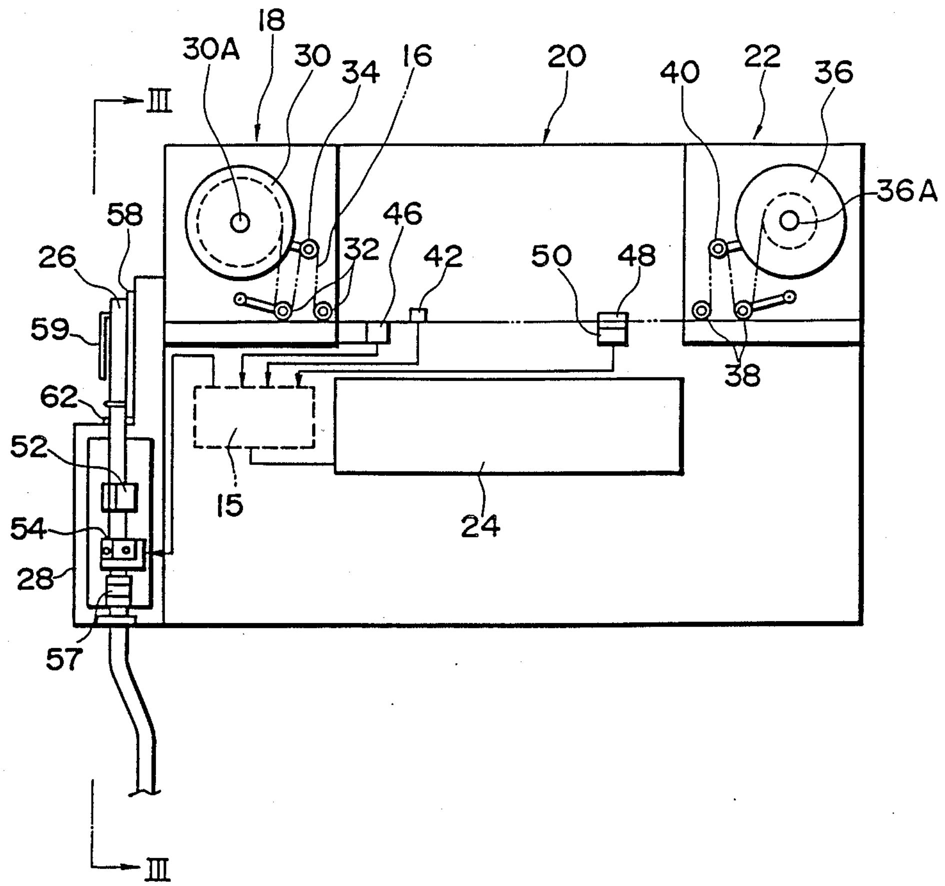
FIG. 2 is a plan view as seen from the top of FIG. 1.
Figure 3:
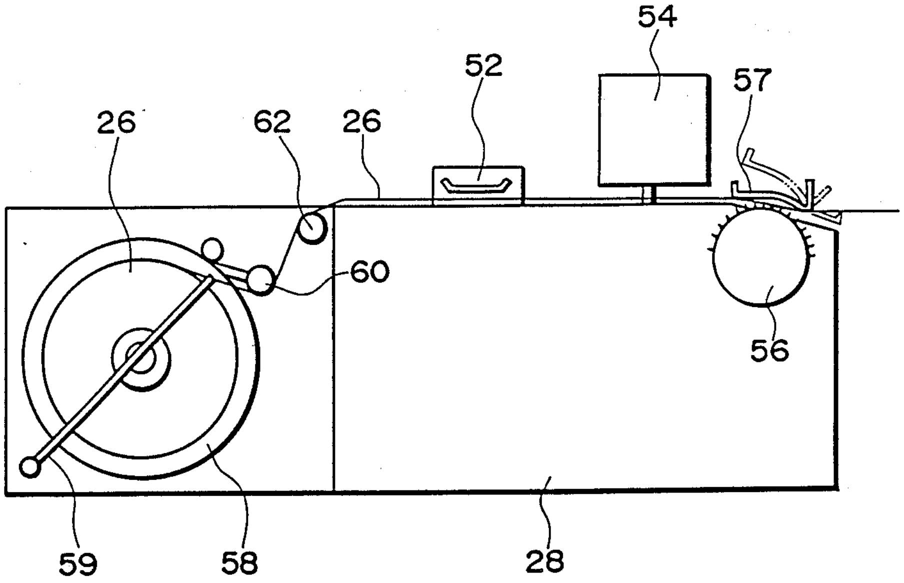
FIG. 3 is a cross-sectional view taken along the line III—III of FIG. 2.

FIGS. 1 to 3 show a notcher-puncher 10 to which the present invention is applied. FIG. 1 is a perspective view of the appearance of the notcher-puncher 10, FIG. 2 is a plan view of the same as seen from the top of FIG. 1, and FIG. 3 is a cross-sectional view taken along the line III—III of FIG. 2.

As shown in FIG. 1, the notcher-puncher 10 has a main body 14 which is mounted on a base 12 to which four casters are attached. A control unit 15 for performing various kinds of control operations of the notcher-puncher 10 is incorporated in the main body 14 of the notcher-puncher. Above the main body 14 are successively disposed a film supply section 18 in which a roll of original picture film 16 having a plurality of original pictures and connected by splice tapes is set, a viewer section 20 through which images of the film 16 are observed by an operator with his eye, and a film winding section 22 for winding up the film 16. A control keyboard 24 through which operations of the notcher-puncher 10 are conducted is disposed along these sections.

A punching unit 28 which punches a paper tape 26 is disposed on one side of the main body 14.

As shown in FIG. 2, a supply reel 30 is provided in the film supply section 18. The original picture film 16 is set around a center shaft 30A of the supply reel 30.

A pair of guide rollers 32 are disposed in the film supply section 18 such that they stand vertically. A tension roller 24 is also provided. The film 16 is supplied from the film supply section to the film winding section 22 while being guided by the pair of guide rollers 32 and tensed by the tension roller 34.

A winding reel 36 is provided in the film winding section 22. The original film 16 is wound around a center shaft 36A of the winding reel 36.

In the film winding section 22 also, a pair of guide rollers 38 and a tension roller 40 are disposed in a manner similar to that in the case of the film supply section 18. After being supplied from the film supply section 18, the film 16 is wound up around the winding reel 36 while being guided by the pair of guide rollers 38 and tensed by the tension roller 40.

The viewer section 20 is positioned between the film supply section 18 and the film winding section 22. In the viewer section 20, images which are formed on the film 16 supplied from the film supply section 19 are observed by the operator with his eye so that the amount of exposure correction at the time of printing is determined.

A frame number reader 42 is disposed in the viewer section at a position nearer to the film supply section 18. The frame number reader 42 is adapted to read bar codes 44, such as those shown in FIG. 4, which indicate the image frame numbers and which are previously displayed on the original picture film 16. The frame number reader 42 is connected to the control unit 15.

A detector 46 for detecting whether the size of images on the original picture film 16 is half size or full size is also disposed in the viewer section 20. The detector 46 is also connected to the control unit 15.

A plate 48 for positioning the film 16 in the viewer section 20 is disposed in this section. A notcher 50 adapted to form notches 49 is disposed under the plate 48.

Figure 4:
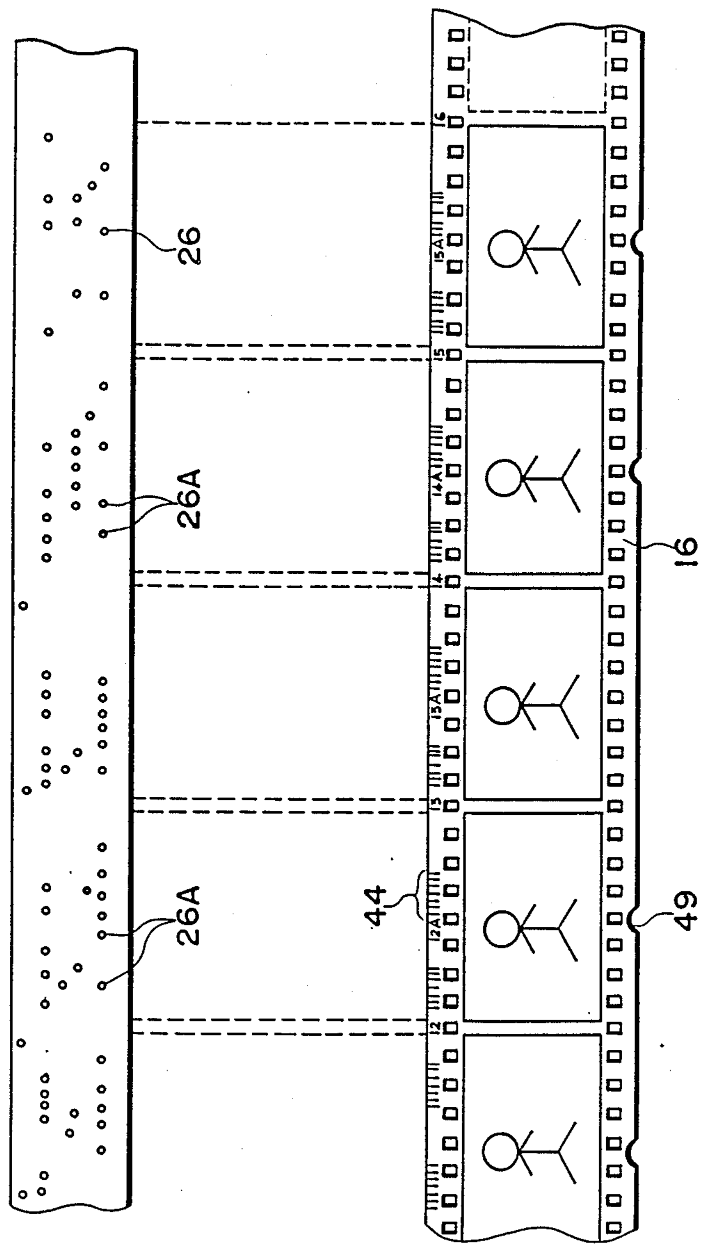
FIG. 4 is an illustration of an original picture film and a paper tape.

As shown in FIG. 3, the punching unit 28 is provided with a tape retaining member 52 for retaining the paper tape 26, a punching head 54, and a sprocket 56 for transferring the paper tape 26. A retaining lever 57 is disposed above the sprocket 56 and is adapted to press the paper tape 26 on the sprocket 56. A device (not shown) for driving the punching head 54 and the sprocket 56 is connected to the control section 15. The punching head 54 is thereby made to punch holes 26A in the paper tape 26, as shown in FIG. 4.

A paper tape reel 58 is disposed at the rear of the punching unit 28. A roll of paper tape 26 is set on the paper tape reel 58 while being retained by a paper tape retainer 59. A tension roller 60 and a guide roller 62 are disposed between the paper tape reel 58 and the punching unit 28. The paper tape 26 is transferred to the punching unit 28 while being tensed by the tension roller 60 and guided by the guide roller 62.

The operation of this embodiment will now be described below.

The original picture film 16 is set in the film supply section 18 while the paper tape 26 is set in the punching unit 28. The original picture film 16 is thereafter transferred to the viewer section 20. In synchronization with this operation, the paper tape 26 is also transferred to the punching head 54. At this time, the detector 46 detects whether the original picture film is of the full size or of the half size. The control unit 15 drives the punching head 54 so as to make this head punch on the paper tape 26 on the basis of the result of detection supplied from the detector 46.

The frame number reader 42 reads a bar code 44 which represents an image frame number and which has been previously displayed on the original picture film 16, as shown in FIG. 4. On the basis of this reading, the control unit 15 drives and makes the punching head 54 punch the paper tape 26, thereby recording the frame number on the paper tape 26.

A length of original picture film 16 is supplied to the viewer section 20 after the frame number of the corresponding frame has been read and recorded on the paper tape. In the viewer section 20, the amount of exposure correction is determined by observation with the eye of the operator and is input through the control keyboard 24. The paper tape 26 is punched in accordance with this input and in correspondence with the related frame so that the amount of exposure correction, as well as the frame number information, is recorded on the paper tape 26, as shown in FIG. 4.

After the exposure correction information has been determined, a notch 49 is formed in the original picture film 16 in correspondence with the related frame.

After the notch 49 has been formed, the corresponding length of original film 16 is wound up around the winding reel 36. The above-described operation is repeated and the frame numbers are recorded on the paper tape 26.

The paper tape 26 thus prepared is used in such a manner that the frame numbers thereof are read during printing process and are displayed on photographic paper. The paper tape can also be used in a character printing apparatus while the frame numbers are read and displayed on photographic paper. The frame numbers can also be read and displayed on photographic paper at the time of examination of photographic paper.

If printing and development of part of framed images has resulted in failure, e. g., exposure failure or color balance failure, related exposure correction information recorded on the paper tape can be immediately read out therefrom by finding thereon a number which is equal to the frame number indicated on the photographic paper, and whether or not this correction information is appropriate can be judged. It is also possible to make re-correction information on the basis of the correction information. In the printing apparatus, the paper tape and the original picture film are transferred in synchronization with each other with respect to each frame, and items of exposure correction information on printed image frames are read so that printing is performed with automatically corrected exposure. It is therefore possible to automatically find a desired image frame in the original picture film by simply inputting a number corresponding to the frame number of this frame.

In accordance with the present invention, as described above, the frame numbers can be indicated on the photographic paper on the basis of the frame numbers recorded on the paper tape, in a succeeding step after examination, thereby facilitating collation between the original film and corresponding frames formed on the photographic paper.

What is claimed is:

1. A photographic printing tape puncher for recording, before a printing process, exposure correction information on a tape with respect to each of image frames formed on a lengthwise original picture film, said tape puncher comprising a film supply section in which a roll of an original picture film is accommodated;

a film winding section for winding up said original picture film supplied from said film supply section;

image display means for inspecting and displaying each image in order to determine information on exposure correction for each image frame of said original picture film while said original picture film is supplied from said film supply section to said film winding section;

frame number reading means for detecting the frame number of each image frame displayed by said image display means by reading a corresponding bar code indicated on said original picture film;

tape supply means for supplying, in a linked relationship with the supply of said original picture film to said image display means, said tape into which said exposure correction information is input; and tape punching means for punching said tape so as to record thereon a frame number read by said frame number reading means, and exposure correction information on the basis of a corresponding image displayed by said image display means;

whereby said frame number of said image frame displayed by said image display means and said exposure correction information are recorded indicated on said tape in correspondence with each other.

2. A photographic printing tape puncher according to claim 1, further comprising a detector for detecting whether an image displayed by said image display means is of full size or of half size, and recording the detected size on said tape.

3. A photographic printing tape puncher according to claim 2, wherein said frame number reading means and said detector are disposed nearer to said film supply section than said image display means, and wherein an image frame is supplied to said image display means after the detection of the frame number of said image frame and the detection of whether the size thereof is full size or half size have been completed.

4. A photographic printing tape puncher according to claim 1, further comprising a keyboard through which said exposure correction information is input on the basis of said image displayed by said image display means.

5. A photographic printing tape puncher for successively supplying, to an image display means, an original picture film formed of a plurality of lengthwise films connected to each other in series, and recording, on a paper tape, information on exposure correction for each of displayed image frames, said tape puncher comprising:

frame number reading means for determining the frame number of an image displayed by said image display means by reading a corresponding bar code provided on an original picture film at a side thereof; and control means for displaying a frame number read by said frame number reading means along with corresponding exposure correction information on the basis of combinations of a plurality of holes punched in said paper tape.

6. A photographic printing tape puncher according to claim 5, further comprising a detector for displaying, together with a frame number, whether a corresponding image displayed by said image display means is of full size or of half size.

7. A photographic printing tape puncher according to claim 6, wherein said control means records said frame number and discrimination of half size or full size on said paper tape before it inputs said exposure correction information into said paper tape.

8. A tape puncher for recording, on a paper tape, a combination of plurality of small holes representing information on exposure correction for each of image frames formed on a lengthwise original picture film, before the image of said image frame is printed on photographic paper, said tape puncher comprising;

a supply reel for setting a lengthwise original picture film by winding up the same;

a detector for detecting whether each image frame of said original picture film drawn out of said film supply reel is of full size or of half size;

frame number reading means for reading bar codes which represent frame numbers of said image frames and which are indicated at a side of said original film;

image display means for displaying the image of each image frame which has been examined by said detector and said frame number reading means;

a film winding reel for winding up part of said original picture film which has been displayed by said display means;

input means enabling an operator to input exposure correction information on the basis of an image displayed by said image display means; and control means for recording on said paper tape the image frame size and exposure correction information in correspondence with each frame number.

9. A tape puncher according to claim 8, wherein said detector and said frame number reading means record the frame size and the frame number on said paper tape before a corresponding image frame from which the size and the frame number have been read reaches said image display means.

10. A tape puncher according to claim 8, further comprising a control means for supplying said original picture film to said detector, to said frame number reading means, and to said image display means while transferring said paper tape in synchronization with said supply of said original picture film.

* * * * *